United States Patent [19]

Raymond

[11] Patent Number: 5,273,652
[45] Date of Patent: Dec. 28, 1993

[54] ORIFICE RESTRICTION SHIELDING DEVICE

[76] Inventor: Robert E. Raymond, 495 Military Rd., Zanesville, Ohio 43701

[21] Appl. No.: 912,237

[22] Filed: Jul. 13, 1992

[51] Int. Cl.$^5$ .............................................. B01D 29/48
[52] U.S. Cl. .................................... 210/452; 210/488; 210/497.1; 29/163.7; 29/163.8
[58] Field of Search ............................ 29/163.7, 163.8; 210/452, 488, 489, 497.01, 497.1, 497.2

[56] References Cited

U.S. PATENT DOCUMENTS

| | | | |
|---|---|---|---|
| 3,937,281 | 2/1976 | Harnsberger | 210/497.1 |
| 4,133,768 | 1/1979 | Theriot | 210/452 |
| 4,249,292 | 2/1981 | Calderon | 29/163.7 |
| 4,284,138 | 8/1981 | Allred | 210/497.1 |
| 5,028,008 | 7/1991 | Arai | 210/497.1 |

*Primary Examiner*—Robert A. Dawson
*Assistant Examiner*—W. L. Millard

[57] ABSTRACT

An orifice shield for preventing blockage of an orifice restriction by large particulate matter relative to the size of an orifice restriction in a fluid power control circuit. The orifice sheild incorporates a unitary body provided with a wire coil wound about an external threaded portion of the body. The body includes an internal blind bore and longitudinal slots which cooperate to communicate with the opening between coils of the wire. One end of the body is provided with a rotational driver receiving recess to permit external thread on the body to be threaded into a mating bore. A conventional set screw or round head bolt may be readily modified to form the one piece body portion. Other embodiments are described wherein the unitary body includes an internal threaded bore to accept a removably mounted orifice restriction element wherein the orifice restriction element and shielding device forms a compact unit conveniently removably mountable into a fluid power port opening or passage threadably adapted to receive the shielding device.

4 Claims, 4 Drawing Sheets

5,273,652

ORIFICE RESTRICTION SHIELDING DEVICE

TECHNICAL FIELD

The present invention relates generally to fluid screening or filter devices and particularly to a device for shielding a fluid orifice restriction only from particulate debris large enough to block the orifice restriction.

BACKGROUND ART

It is common in the prior art to employ filtering devices adapted to filter fine particulates from the fluid medium circulating through the system and constitute a primary filtering system for fluid recycled through the circuitry. Such filters are of relatively large capacity to be capable of handling the necessary flow volumes without becoming too quickly saturated with the collected contaminants to avoid the necessity of frequent replacement. Further such primary filters are disposed upstream of the fluid control circuitry and are typically associated with the outlet flow from the source of fluid supply and/or the return flow to the fluid reservoir.

It is also known in the prior art that filter devices can be constructed using a wire coil wound about a threaded body provided with slots to create openings of predetermined size. These openings form passageways between the exterior of the coil and an internal axial passage or passages formed in the threaded body. However, these prior art teachings are concerned primarily with forming a relatively fine primary filter and utilize a relatively complex construction involving several parts to assure the openings between turns of the coil are maintained within a small tolerance. Others deal with matching certain configurations of a wire coil to the threads on the body to form a highly refined, primary filter.

Examples of these prior art teachings include U.S. Pat. No. 4,569,763 which teaches a method to lock the ends of the wire coil to a threaded body but does not teach or address any other aspects of making use of such a device in connection with other fluid operative elements.

U.S. Pat. No. 5,028,008 discloses a device including a wire coil wound around a multiple port core which comprises a cylindrical body provided with a separate obstructing cover at one end and a separate base at the other end forming an outlet for fluid passing between the wire coil and interior passageways in the body.

However, the prior art has failed to provide a low cost device which addresses the problem of adequately shielding an orifice restriction in a fluid circuit in a practical manner which can be simply and inexpensively made using conventional methods and means.

BRIEF DISCLOSURE OF INVENTION

Orifice restrictions are well-known and have long been used in fluid power circuitry. They are particularly useful in fluid power control circuits wherein pilot flow rates of the fluid are typically in the low range compared to the flow rate to the power elements. While most fluid power system generally use a primary filter device to maintain the fluid in as "clean" a state as possible, particulate material such as a random metal chip or piece of a defective seal for example, may randomly appear or originate downstream of the primary filter. In such an event, if the solid particulate is of sufficient size relative to a given downstream orifice restriction, the orifice can become blocked and cause a total failure of control functions connected in series to the orifice.

The present invention relates generally to fluid screens or filters and particularly to a fluid screen or shield to prevent blockage of an orifice restriction only by randomly encountered particulate matter large enough to block the orifice restriction as compared to filtering smaller debris which might be present in the fluid. More particularly, the present invention relates to such a device which utilizes a wire coil wound in engaging relationship with the external threads of a unitary body which includes an internal blind bore and longitudinal slots which cooperate to communicate fluid through the openings between the wire coil.

In one aspect of the present invention, a conventional set screw or round head bolt is modified to function as an integrally formed one-piece body carrying a wire coil along a portion of its threaded axial length to cooperate with longitudinal slots and an internal blind bore to form a particulate barrier. A portion of its threaded length is adapted to be received in a female threaded portion of a fluid passageway, preferably, provided within a housing module and interconnected in series to a downstream orifice restriction forming a part of a fluid circuit.

In another aspect of the present invention, the internal bore provided in the threaded body is provided with female threads to accept a removably mounted orifice restriction element to conveniently form a removably mounted element combining an orifice shield and orifice restriction as a unitary, removably mounted element of a fluid circuit. Such a device is readily adapted to be removably disposed in an accessible fluid passage through a port opening in a manifold block or the like to enhance assembly and replacement as may be required.

In another preferred embodiment of the present invention, a cylindrical head bolt having a conventional threaded shank is modified so the enlarged head portion also includes external threads adapted to be threadably received into the open end of a fluid passage. The head also includes an outlet opening communicating with an internal bore passage provided in the threaded shank portion and includes an appropriate recess or slot configuration to accept a standard driver tool, preferably an Allen wrench, for example.

In another preferred embodiment, a set screw of the type having a constant diameter can be used to form the threaded body. The wire coil extends over a predetermined portion of the shank to leave an exposed threaded portion at the end opposing the Allen head recess for example, to permit the body carrying the wire coil to be threadably received in a bore of a housing which is adapted to be mounted in communication with mating parts of adjoining manifold or port plate blocks or the like. This configuration may also be employed to include an orifice restriction element which itself is removable mounted in an internal bore in the shank to form an inexpensive fluid operative element easily mountable in an existing valve block or manifold arrangement.

As a further aspect of the present invention, the standard form of a conventional threaded fastener referred to above is readily modified to function as a core for a wire coil by merely milling appropriate longitudinal flats along a portion of the external threads and drilling an internal axial bore which terminates prior to the opposing end of the screw body. Depending upon the desired configuration, the open end of the bore may be provided with internal threads to removably receive an orifice restriction element to form a unitary combination of an orifice shield and orifice restriction in a very compact, convenient to use configuration.

It is therefore a primary object of the present invention to provide an inexpensive, convenient to use orifice restriction shielding device to protect the orifice restriction from being blocked by debris having a size range commensurate with the orifice restriction.

It is another object of the present invention to provide an orifice shielding device which comprises a standard screw or bolt modified to form an integral body portion for accepting a wire coil having predetermined spacing between the turns of the coil.

It is a further object of the present invention to provide a device of the type described which is further modified to accept a removably mounted orifice forming element in an internal bore of the device to form a unitary, easily installed element combining an orifice restriction and orifice shield in closely adjacent relationship to enhance reliable operation of the orifice restriction as an operative element of a fluid circuit.

DETAILED DESCRIPTION

Figure 1:
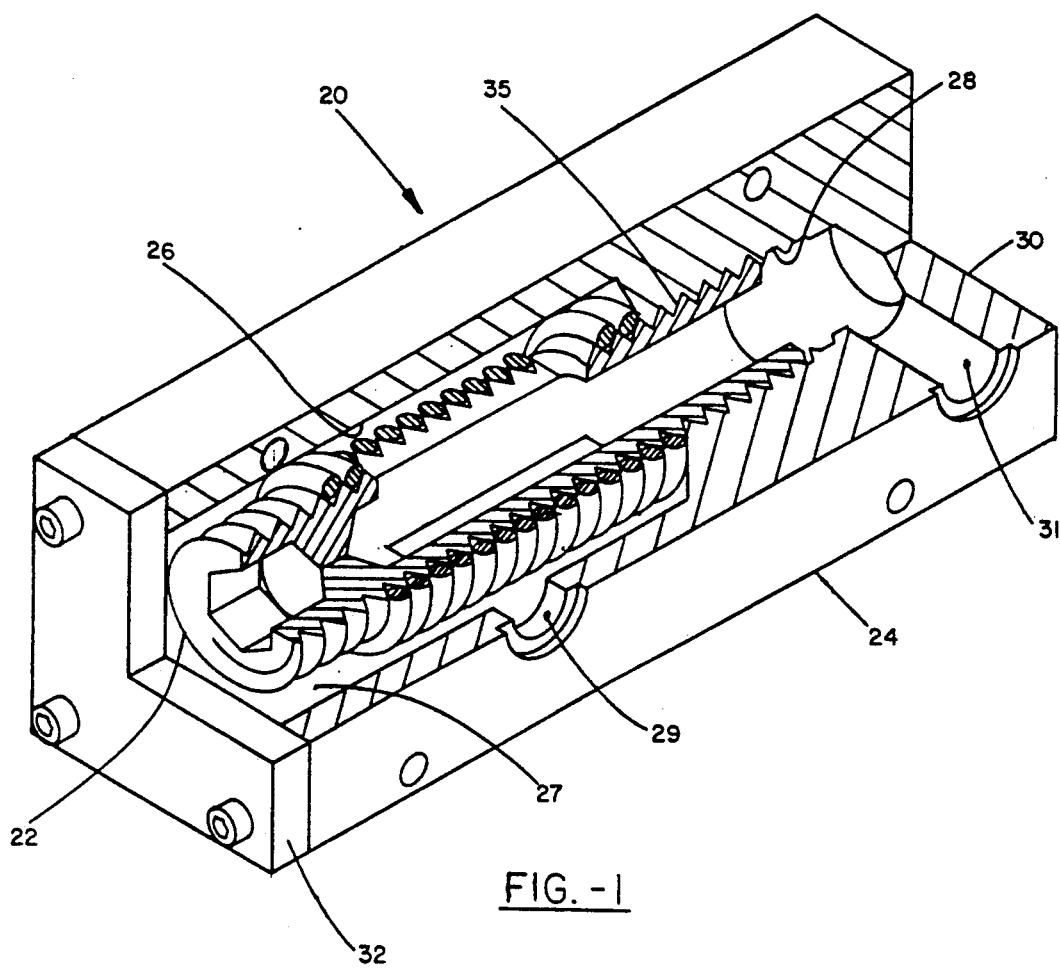
FIG. 1 is a perspective view of a self-contained module element for an orifice restriction shielding device constructed in accordance with the present invention, a portion of the housing and shielding device being shown cut-away.

A module type element comprising a housing 20 and a removably mounted orifice restriction shielding device indicated generally at 22 constructed in accordance with the present invention is shown in FIG. 1. Housing 20 comprises a block 24 of suitable material, such as steel or preferably aluminum, provided with an annular cavity formed by a drilled bore 26 and a coaxial, smaller diameter drilled bore or annular threaded recess 28 formed in a rear wall of bore 26 and which terminates adjacent to the closed end 30 of block 24. A pair of housing ports 29 and 31 are drilled into block 24 perpendicular to the axis of bores 26 and 28 in spaced relationship to one another along the length of said bores.

The end of bore 28 is conventionally provided with female threads 35. A cap end closure 32 is removably fixed over the open end 27 of bore 26 by a plurality of bolts, not shown.

Orifice shielding element 22 comprises an elongate body 34 provided with a plurality of external screw threads 36. An axial hole or bore 38 extends through the center of the threaded body 34 from an open end 40 toward a closed end 42. Closed end 42 is provided with a recess 44 adapted to engagably receive a conventional driver tool, such as an Allen wrench, to permit one to turn the body 36 to thread it into a mating threaded hole. Other forms of recesses or slots conformed to accept a conventional driving tool could be employed without departing from the spirit of the present invention.

As seen in FIGS. 1-5, a pair of milled flats 46 are provided on body 34 which interrupt an arcuate portion of threads 36 and form longitudinal slots 47 which communicate with a portion of the length of central bore 38. A wire coil 48 is wound on threads 36 and extends beyond each end of the slots 47 in fluid sealing relationship to threads 36. The wire coil is preferably formed of conventional steel spring wire and assumes a spacing between each turn of the coil as set by the angle of helical threads 36 to form a plurality of openings or slits 49 communicating with the central bore 38 and the outlet of open end 40.

For purposes of the present invention, the dimensions of the openings or slits formed between each turn of coil 48 should be of a size related to the dimensions of a particular orifice restriction or restrictions disposed in series downstream in the fluid circuit. The slits are intended to trap or collect only those particulates large enough to likely block or close the orifice restriction. If the slits are too small, they would tend to become quickly clogged themselves with finer particulate debris which would otherwise pass through the orifice restriction. If clogging of all the slits 49 occurs, this would be tantamount to blocking the orifice as flow would be stopped in the circuit. Such a result is totally contrary to the purpose of the present invention which is to shield the orifice from becoming blocked by a particle of debris large enough to close the orifice passage. Blockage of an orifice restriction would result in total failure of the control functions in the portion of the fluid circuit in series with the orifice restriction and in certain applications would be deemed, at least highly undesirable, and in some cases approach a total failure in the intended operation of the system.

In the preferred embodiment shown in FIGS. 1-5, body 34 is a conventional set screw, readily available at very modest cost, which is modified by a conventional drilling operation to form the blind hole or bore 38. The longitudinal flats 46 forming slots 47 may be formed by a simple milling operation. The resulting structure is a one-piece, integral threaded body 34, having a threaded exterior 36 and a head provided with the Allen or other conventional form of a driver-receiving recess 44.

The vast array of standard sizes available in such commercially available set screws provides a wide latitude of choices for selection of an appropriate size and thread spacing and wire diameter to accomplish the desired spacing between the turns of the coil 48 and the flow area represented by the sum of the areas of each slit or opening 49 between turns of the coil along the length of slots 47. It particularly provides relatively small size bodies which are advantageously used in the relatively small diameter port passages typically employed in pilot control circuitry for fluid operated systems.

Figure 3:
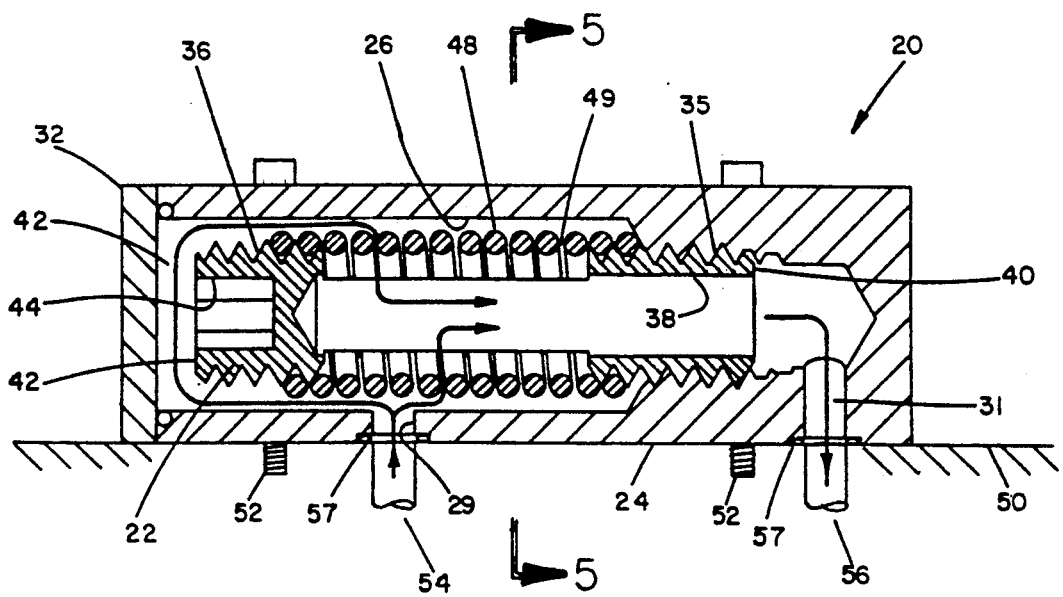
FIG. 3 is a side elevational sectional view of the module element shown in FIG. 1, the section being taken along the axis of the shielding device.

As best seen in FIGS. 1 and 3, the end 40 of the modified set screw body 34, opposite recess 44, may be threaded into mating female threads 35 provided in housing bore 28 to removably mount body 34 within housing block 24. Assembly of the module element is completed by attaching cap closure 32 via bolts or the like.

The module assembly 20 can be advantageously used in the configuration shown in FIG. 3 by removably attaching housing block 24 to a fluid circuit manifold body 50 via bolts 52 aligning housing ports 29 and 31 with corresponding ports 54 and 56 of manifold body 50. O-rings 57 surround the junction of these mating ports in a conventional fashion. Manifold 50 may conveniently be any type of conventional fluid power control manifold comprising the necessary fluid passages forming the interconnections between associated fluid power control elements forming a fluid circuit. Alternatively, ports 29 and 31 may be threaded to conventionally receive pipe interconnections in communication with conventional valve bodies comprising a part of a fluid power package. The module element containing the orifice restriction shielding device would then protect any orifice restriction located downstream from outlet port 31 from particulate debris large enough to block the orifice which originate upstream of inlet port 29 and downstream of any major filtering device in the system.

As earlier mentioned herein, random chips or similar large particulate debris entering port 29 would be trapped and prevented from passage through the slits 49 and into the bore 38 communicating with port 31.

Figure 2:
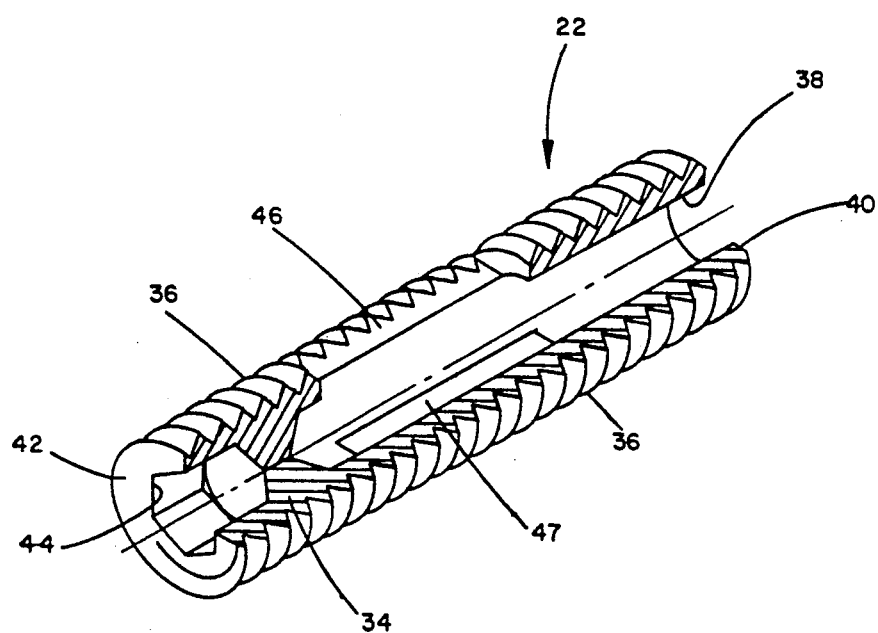
FIG. 2 is a perspective view of the threaded body of the orifice shielding device shown in FIG. 1 removed from the housing.
Figure 4:
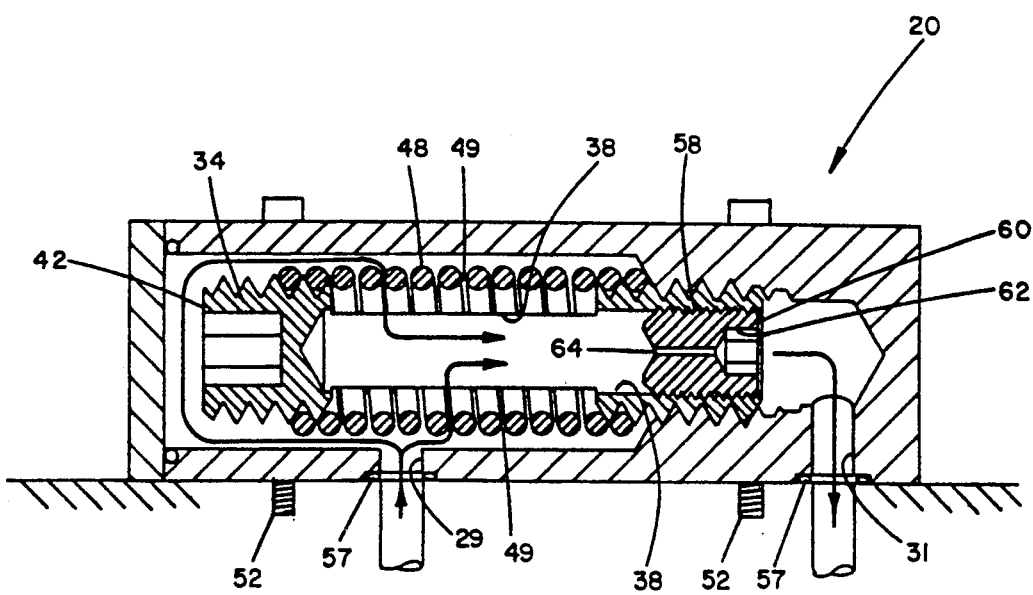
FIG. 4 is a side elevational sectional view similar to FIG. 3 illustrating the addition of an orifice restriction plug element removably mounted within the shielding device.
Figure 5:
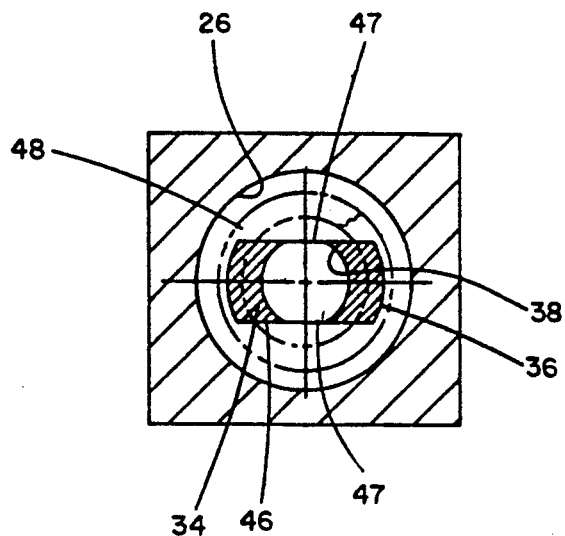
FIG. 5 is an end sectional view of the module element shown in FIG. 3, the section being taken along line 5—5 in FIG. 3.
Figure 6:
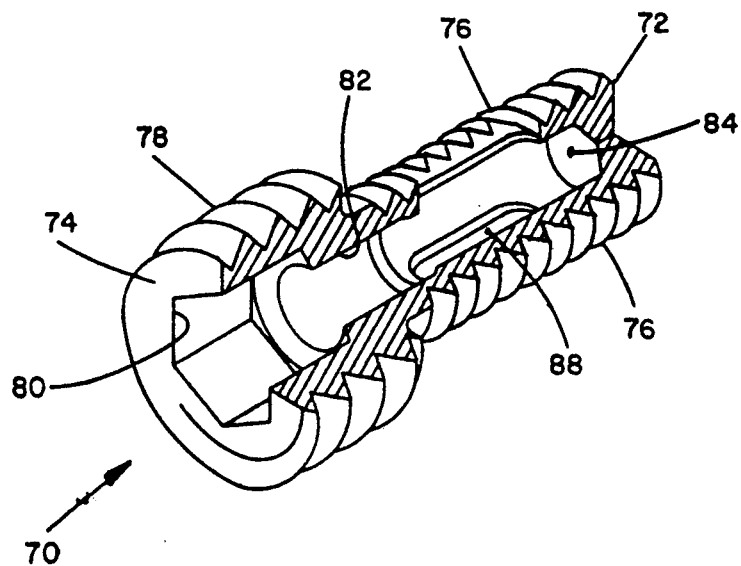
FIG. 6 is a perspective view of another embodiment of the threaded body portion of an orifice shielding device constructed in accordance with the present invention.

A modified embodiment of the present invention is shown in FIG. 4, wherein the identical structure described with regard to FIGS. 1-3 carry the same reference numerals to indicate identical parts. The only difference in the embodiment of FIG. 4 is the addition of an orifice restriction element 60 which is threadably received in a threaded portion 58 of the open end of bore 38 of body 34 accommodating the threaded body 60.

Element 60 preferably is formed from a standard, commercially available cylindrical set screw having a conventional external thread and a driver receiving recess, such as Allen head recess 62. The set screw 60 has been modified to function as an orifice restriction plug type element by drilling a central hole 64 through the body as shown in FIG. 4.

For assembly, orifice restriction element 60 is threaded into bore 38 prior to threading the body 34 into bore 28 by conventional use of an Allen type wrench.

It should be readily appreciated that the combined assembly shown in FIG. 4 represents an easily manufactured, convenient to use, unitary fluid power control element which not only provides a shielding member for the orifice restriction, but provides the orifice restriction element in a close proximity to the shielding element in a very compact package. It is highly desirable, when practical, to provide an orifice restriction shielding element in close proximity to the orifice restriction to be protected and ideally to provide a separate shielding device for each orifice restriction in the circuit to maximize the protection against the occurrence of a blockage of the orifice.

Now referring to FIGS. 6-9, another embodiment of an orifice shielding member constructed in accordance with the present invention is shown and illustrates a one-piece body portion, indicated generally at 70, which comprises a shank 72 and an integrally formed enlarged head 74. Both the shank 72 and the head 74 are provided with external threads 76 and 78 respectively.

Head 74 includes a conventional driver-receiving recess, such as for example an Allen head recess 80. A central, axial bore 82 is drilled through the center of recess 80 and shank 72 and terminates near closed end 84 of shank 72. Shank 72 is provided with a pair of milled flats 86, best seen in FIG. 9 which interrupt a predetermined arcuate length of threads 76 to form longitudinally extending slots 88 which communicate with a section of bore 82 in a similar manner as described in the embodiment shown in FIGS. 1-5.

A wire coil, preferably of steel spring wire 90, is wound about threads 76 of shank 72 over slots 88 and beyond each end thereof in fluid sealing relationship to threads 76 to form open slits 92 between the turns of coil 90 which are in communication with bore 84.

Figure 7:
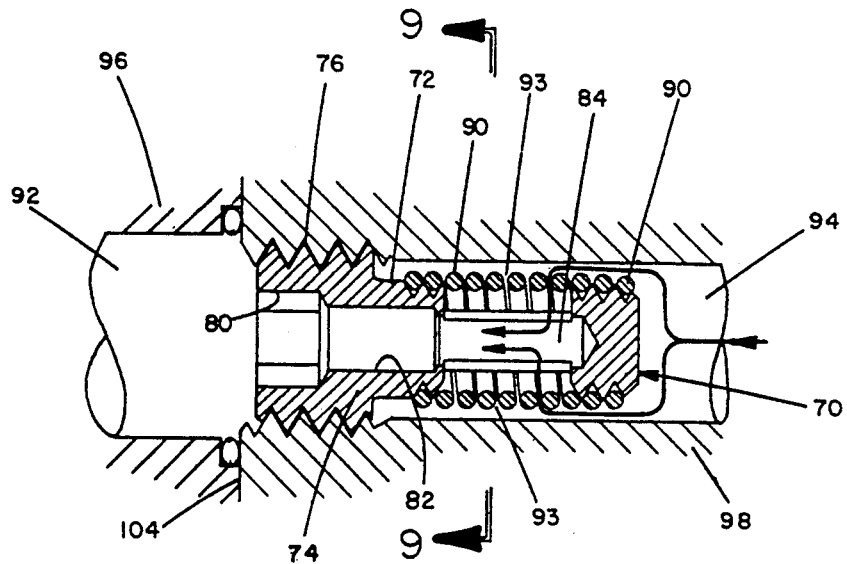
FIG. 7 is a side sectional view of the embodiment shown in FIG. 6 illustrating the shielding device mounted with a fluid port passage between adjoining fluid power manifold sections—the section being taken along the axis of the shielding device.
Figure 8:
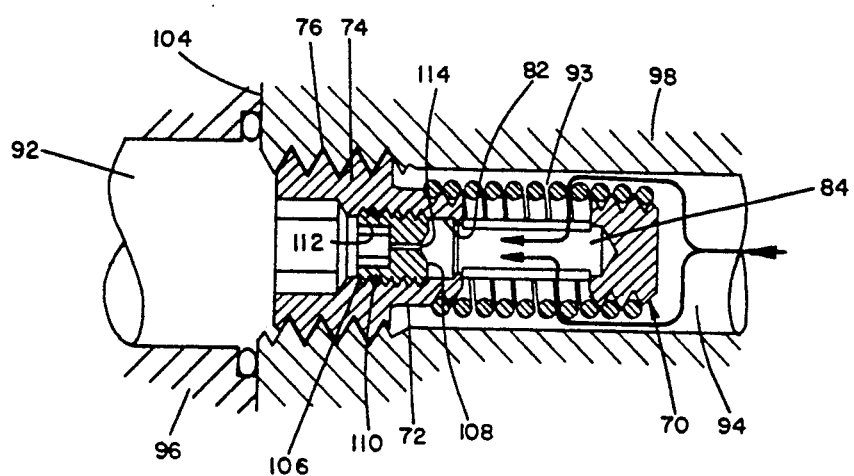
FIG. 8 is a side sectional view similar to FIG. 7 showing an orifice restriction plug element mounted within the shielding device.
Figure 9:
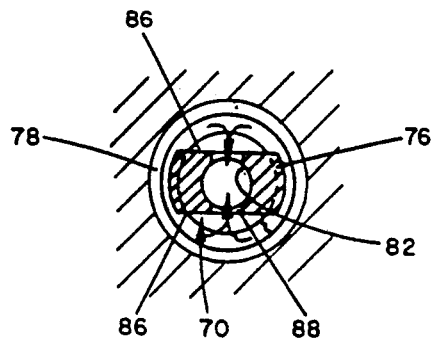
FIG. 9 is an end section view of the device shown in FIG. 7, the section being taken along line 9—9 in FIG. 7.

As best seen in FIGS. 7 and 8, the orifice restriction shielding element 70 is most advantageously used in communication between a pair of in-line port passages, such as 92 and 94, which are formed in removably connected, adjoining manifold or valve mounting plate bodies represented by numerals 96 and 98. For example, body 96 may be a conventional mounting surface of a conventional valve body bolted or otherwise removably connected in a conventional manner, not shown, to a block manifold 98 provided with various fluid passages forming the interconnections of a fluid power control circuit.

As seen in FIG. 7, the port passage 94 is simply provided with conventional female threads adapted to removably receive the threaded portion 78 of head 74 in a fluid sealing relationship to mount orifice restriction shielding element 70 within the passage 94 below the interface 104 of bodies 96 and 98.

Fluid in passage 94 therefore must pass around the exterior of shank 72 in the space between the coil 90 and the inner walls of passage 94 and through slits 93 between turns of coil 90 to enter bore 82 and exit through recess 80 and enter passage 92.

Any particulate debris, such as a random metal chip or the like, larger than the dimension of slits 92 will be prevented from entering bore 82. In a similar manner as described in the embodiment of FIGS. 1-5, any downstream orifice restriction in series with port passage 92 would be shielded from such particulate debris large enough to be trapped or collected by the slits 93.

Now referring to FIG. 8, the identical structure shown in FIG. 7 is illustrated except that bore 84 is provided with female threads 106 near its joinder with recess 80 and an orifice restriction element 108, of an identical configuration to the element 60 described in relationship to the embodiment shown in FIG. 7, is threadably inserted into bore 84.

In a similar manner the orifice restriction element 108 preferably comprises a standard set screw having an externally threaded surface 110, a driver receiving recess 112, such as an Allen type for example. The set screw has been modified by providing a drilled through passage or bore 114 forming the desired restriction to the flow of fluid.

In a similar manner as described relative to the embodiment shown in FIG. 7, this structure provides, in a single assembly, the compact combination of an orifice shielding element carrying a removably mounted orifice restriction element in close proximity. The unitary combination can be easily assembled and removably mounted within a port passage, such as 94, in a convenient, easily accessible position.

With regard to orifice restriction shielding element 70, a standard cylindrical head bolt may be easily and inexpensively modified to form an integral, one piece body of the shielding device by drilling bore 82 through recess 80, milling flats 86 to interrupt an arcuate portion of threads 76 to form slots 88 which communicate with bore 82, and thread the external surface of head 74. Again a wide variety of standard sizes of such bolts are available to match the size of the bolt to the appropriate size of the port passage as required for a given application.

It should be clear from the foregoing description to one skilled in the art that the orifice restriction shielding element and the combination including an internal removably mounted orifice restriction element, can be manufactured using a standard bolt or screw modified using conventional methods as described and represents significant savings and low cost production. Further, the resulting element is particularly advantageous for use in connection with the relatively small flow passages used in fluid power control circuitry wherein relatively low flows are employed between control valving elements.

While not intended to restrict the application of the present invention, the orifice restriction shielding devices alone or in combination with the simple orifice restriction element disclosed herein may be advantageously employed in a fluid power control manifold of either the common drilled block type or the compact manifold structures shown in my prior U.S. Pat. Nos. 4,011,887 and 4,723,576.

Such elements constructed in accordance with the represent invention provide the necessary protection to downstream orifice restrictions useful in fluid power control circuits to significantly increase the reliability of trouble free operation in a dramatically inexpensive and conveniently accessible format.

It should be pointed out that typical orifice restrictions useful in fluid power control circuitry range in size between about 0.020 to 0.040. Therefore the threads upon which the coil spring wire is wound should provide clearance opening or slits between turns ranging from 0.002 to 0.004 depending upon the size of the orifice restriction. The total flow area represented by the sum of slits such as 49 and 92 can be easily maintained to be several times greater than the orifice restrictions such that they neither pose a significant restriction and pressure drop compared to the protected orifice restriction nor are easily clogged by smaller or finer debris to effectively cause the equivalent of a blocked orifice that halts a control function and interferes with the intended operation of a fluid power element.

I claim:

1. An orifice restriction shielding module adapted to be mounted in communication with a fluid power circuit, comprising, in combination;
   a) a housing having side walls, an end wall and an opposing end opening communicating with an internal annular cavity in said housing, an annular threaded bore communicating with said cavity and extending beyond said cavity toward said end wall, and a cap closure removable mounted over said end opening;
   b) an inlet and outlet port in said housing spaced from one another, said inlet port communicating with said cavity and said outlet port communicating with said threaded recess;
   c) an orifice restriction shielding element removably mounted in said housing including
      i) an integral, one-piece cylindrical body provided with an externally threaded surface axially extending along the length of said body and a first and second end, said first end provided with a rotational driver tool receiving recess provided with a closed bottom wall;
      ii) an axial bore extending through an outlet opening in said second end of said cylindrical body toward the closed bottom wall of said driver-receiving recess in said first end;
      iii) a plurality of longitudinally extending slots interrupting said externally threaded surface and communicating with said axial bore;
      iv) a wire coil engagingly received by said external threads in fluid sealing relationship therewith and extending over and beyond the ends of said longitudinal slots to form predetermined slits between adjacent turns of said wire coil communicating with said axial bore, one end of said wire coil terminating in spaced relationship from said second end of said cylindrical body exposing a plurality of said external threads between said second end and said end of said coil; and wherein the exposed portion of said external threads of said one piece cylindrical body are threadably received in said annular threaded recess in said housing with said cylindrical body disposed completely within said housing to form a passage for the flow of fluid between said inlet and outlet ports through said slits formed in said wire coil.

2. An apparatus for shielding a fluid orifice restriction in a fluid power circuit from solid debris of sufficient size to block said orifice restriction comprising, in combination; a conventional screw fastener having a cylindrical enlarged head portion conformed to receive a rotational driver tool and an integrally formed threaded shank portion and including;
   a) an axial bore in said shank having an opening extending through said head and terminating prior to an end of said shank opposite said head;
   b) at least one longitudinally extending slot interrupting said threaded shank and communicating with said axial bore;
   c) a wire coil wound about said threaded shank and extending beyond the length of said longitudinal slot to form a plurality of fluid passages between certain of the adjacent turns of said coil and said bore; and
   d) said head portion provided with a plurality of external threads conformed to matingly receive a female threaded bore.

3. The apparatus defined in claim 2 wherein said axial bore in said shank is provided with a female threaded portion; and said fluid orifice restriction comprises a cylindrical body provided with an external threaded surface, a recess in one end conformed to receive a rotational driver tool, and an axially extending orifice restriction passage having outlets at each end of said cylindrical body to define a predetermined pressure drop to the flow of fluid through said axial bore in said shank, said cylindrical body being removably mounted through said opening in said head in threadably received relationship with said female threaded portion in said axial bore in said shank.

4. An apparatus for shielding a fluid orifice restriction in a fluid power circuit from solid debris of sufficient size to block said orifice restriction comprising, in combination;
   a) an integrally formed elongate body provided with an externally threaded surface extending along substantially the entire length of said body and having a first and second end, said first end provided with a recess having a closed bottom wall, said recess conformed to receive a tool driver for rotation of said threaded body;
   b) a centrally disposed longitudinal bore in said body extending from an outlet opening in said second end toward said closed bottom wall of said recess in said first end;
   c) said integrally formed body including at least one longitudinally extending slot interrupting said external threaded surface and disposed intermediate said first and second ends in communication with said longitudinal bore;
   d) a wire coil engagingly received by said external threads along a longitudinal length of said body in overlapping relationship to said longitudinal slot to form predetermined openings between adjacent turns of said coil, one end of said wire coil terminating prior to said second end portion of said body to expose a plurality of said external threads; and said orifice restriction comprising a cylindrical body provided with an external threaded surface, a recess in one end thereof conformed to receive a rotational driver tool, and an axially extending orifice restriction passage having outlets at each end of said cylindrical body to define a predetermined pressure drop to the flow of fluid through said longitudinal bore, said cylindrical body being threadably received in removably mounted relationship through said outlet opening in said centrally disposed longitudinal bore.

* * * * *